Sept. 3, 1935. E. G. BRADBURY 2,013,549
SIGHTING APPLIANCE FOR TELESCOPIC INSTRUMENTS
Filed April 4, 1933
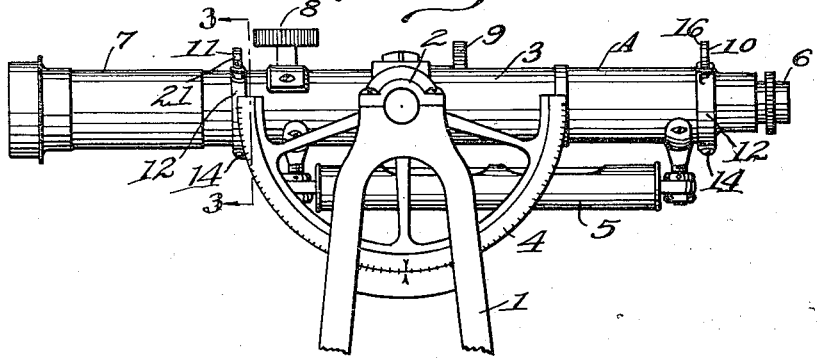
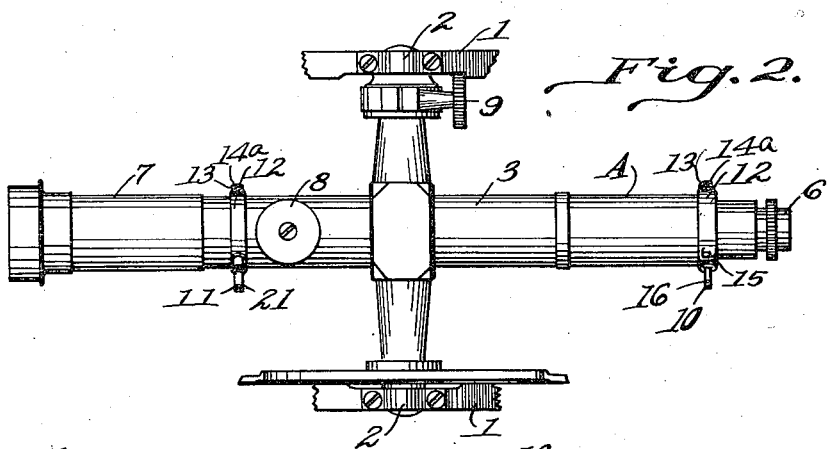
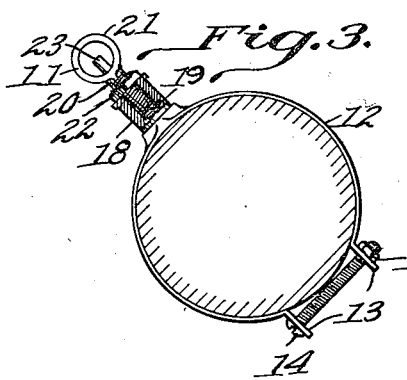
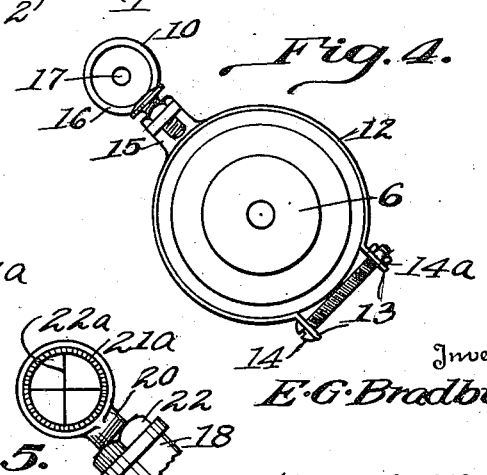
Inventor
E. G. Bradbury
By W. S. McDowell
Attorney Patented Sept. 3, 1935

2,013,549

UNITED STATES PATENT OFFICE 2,013,549

SIGHTING APPLIANCE FOR TELESCOPIC INSTRUMENTS

Edward G. Bradbury, Columbus, Ohio

Application April 4, 1933, Serial No. 664,378

4 Claims. (Cl. 33—46)

This invention relates to sighting appliances for use in connection with telescopes, range finders, engineering and surveying instruments, transits and the like, and has for its primary object the provision of simple yet efficient means by which such instruments may be quickly and accurately directed upon a given objective or field of view with the aid of the eye and without magnification, to the end that final sighting of such an instrument, through its usual telescope barrel, may be effected in short order, with convenience and without loss of time.

My invention is directed to the utilization of improved exterior sights adapted to be adjustably mounted in connection with the barrel of a telescopic instrument. In present practice, these instruments are entirely devoid of any exterior sighting means, and the user is required to gaze through the barrel of the telescope in order to direct the instrument upon a desired object, location or predetermined field. This is a difficult, time consuming and tedious operation, due to the limited field of view afforded by such instruments and especially when a given objective is located at some considerable distance from the instrument, or when it possesses a form corresponding to that of adjacent objects.

The present invention therefore resides in providing the barrel of a telescopic viewing instrument with longitudinally spaced, exteriorly located, front and rear sights, whereby when the operator of the instrument sights along these to obtain an unmagnified view of a given objective, the barrel of the instrument and the range of view afforded therethrough will be automatically and correctly directed toward the same objective, thus eliminating the necessity, heretofore present, of requiring the operator, with difficulty and uncertainty, to adjust the telescopic barrel and its internal lens mechanism to bring the instrument with its inherent limited field of vision into registration with the said objective.

A further object resides in the provision of a mounting for the aforesaid exterior sights by which the latter may be adjusted circumferentially around the longitudinal axis of the instrument barrel upon which the sights are mounted, may be adjusted longitudinally of said barrel, and wherein provision is further made for effecting radial adjustments of the sights proper with respect to the instrument barrel, to the end of securing and maintaining the aforesaid sights in desired positions of relative registration with respect to each other and with respect to the range of view afforded through the telescope.

It is a further object of the invention to admit of the ready removal and attachment of the sights to standard surveyors' transits or the like, so that the sighting appliances may be attached to said instruments after the manner of an accessory or, in other aspects of my invention, the sights may be formed to constitute an integral component part of such instruments.

With these and other objects in view, which will appear as the description proceeds, the invention consists in the novel features of construction, combination of elements and arrangements of parts hereinafter fully described and pointed out in the appended claims.

In the accompanying drawing:

Fig. 1 is a view in side elevation of a surveyor's level or transit provided with the exterior sighting appliances formed in accordance with the preferred embodiment of my invention;

Fig. 2 is a top plan view of the instrument showing the sighting appliances mounted thereon;

Fig. 3 is a vertical sectional view taken on the plane indicated by the line 3—3 of Fig. 1 and disclosing more particularly the forward sighting appliances located at the outer end of the instrument;

Fig. 4 is a similar view of the rear sighting appliance mounted on and adjacent to the inner or sighting end of the instrument;

Fig. 5 is a detail view of a modified form of the forward sight.

Referring more particularly to the drawing, the numeral 1 designates the frame structure of a surveyor's transit, an instrument upon which the sighting appliances comprising the present invention are particularly applicable, although they may be used on other telescopic apparatus widely differing in purpose and function from surveying instruments. The upper end of the frame structure is provided in the device illustrated with the usual spaced bearings 2, which effect the trunnioned support of the barrel of the telescope 3. The telescope is provided with customary degree graduated quadrant 4, and spirit level 5. The sighting or inner end of the telescope is provided with an eye piece 6, while the forward or outer end of the barrel is equipped with a longitudinally adjustable outer section 7, the latter being movable with respect to the substantially stationary inner section of the barrel by means of the adjusting screw 8. A screw 9 is disclosed for clamping the barrel in its various positions of vertical adjustment about its horizontally trunnioned axis.

Arranged exteriorly upon the stationary section A of the telescope barrel are longitudinally spaced inner and outer sighting appliances 10 and 11 respectively. In the form of the invention illustrated, these appliances are mounted for ready application to or removal from the barrel A, although it will be understood that it is within the scope of the invention to construct them so that they might be considered an integral or component part of the instrument and incorporated therein at the time of its manufacture. However, since practically all surveyor's instruments now in general use do not have such exterior sights, I prefer to form the latter so that they may be attached after the manner of an accessory.

The sights 10 and 11 as shown but subject to modification, each comprise a split clamp or band 12 which conforms approximately to the cross sectional configuration of the barrel section A, each clamp terminating in spaced lugs 13, which may be united by means of a screw 14, having its shank threadedly received in an opening formed in one of said lugs and/or provided with a nut 14a, whereby when the screw is rotated in a given direction, the clamp will be circumferentially tightened to frictionally grip and retain its positions of adjustment upon the barrel section A. By loosening the screw 14, however, the clamp may be moved longitudinally of or rotated about the barrel section, in order to secure desired operating positions of adjustment of the sighting devices carried thereby.

Usually, the band 12 of the inner sighting appliance 10 is formed with a radially projecting boss 15 with which is integrally or otherwise rigidly formed a disk 16 provided with an axial aperture 17 of relatively small or restricted diameter, and this disk is adapted to be disposed nearest to the eye of the instrument operator. While this is a preferred form of sighting appliance, yet it will be understood that the apertured disk may be omitted and reliance placed on other effective types of similarly adjustable sights.

The outer appliance 11, as shown more particularly in Fig. 3 in one of its preferred adaptations, is provided with a radially disposed and outwardly extending boss 18, which in this instance is formed with a threaded socket 19 for the reception of the threaded shank 20 of a sighting ring 21, or its equivalent, the internal diameter of the ring 21 being appreciably greater in diameter than that of the aperture 17. By the provision of its threaded shank 20, the ring 21 may be adjusted radially with respect to the center of the barrel A, in order that the apertures in the disk 16 and the ring 21 may be brought into desired longitudinal registration. The important feature of this construction resides in the fact that this adjustment of the sighting appliances permits the range afforded thereby to substantially exactly coincide with the visual range obtained by sighting through the internal prisms or lenses (not shown) of the telescopic barrel. A lock nut 22 may be provided on the shank 20 to retain the adjustment of the forward sight 21. Also, the latter may be provided with a centering projection or pin 23, which is located within the confines of the ring aperture and is of a length approximately corresponding to that of the radius of the ring aperture. In Fig. 5, a modification has been disclosed wherein the ring 21a is provided with intersecting cross hairs 22a and in this form of my invention, the ring 21a is circumferentially adjustable in its mounting to always maintain the cross hairs in truly vertical and longitudinal planes.

In the use of the instrument, the sighting appliances 10 and 11 are mounted on the telescopic barrel so that they will be in longitudinal alignment and out of registration with any projecting part on the barrel which might tend to obscure a longitudinal view along the barrel in the plane of the sights. Thus in the form of the invention illustrated, the sighting appliances 10 are arranged in angular relationship with respect to the vertical due to the presence of the thumb screw 8, although it will be understood that if the thumb screw were located at the side of the barrel, then the sighting appliances could be disposed in a vertical plane passing through the center of the barrel. The sights are adjusted to bring the apertures thereof into desired alignment, whereby when the operator locates a given objective through the apertures of the sighting appliances, the barrel of the instrument will likewise substantially exactly coincide in the range of view afforded thereby with said objective. When this is done no material further adjustments of the ordinary universal supporting mountings for the instrument barrel are required. It is a very simple matter to sight through the apertures of the appliances 10 and 11 and adjust the barrel during such sighting to train it upon the objective as the operator does not have his normal vision restricted in any way. Such a wide view is not afforded by the customary sighting through the focally adjusted lenses arranged internally of the telescope, which is distinctly limited and perplexity exists when the objective corresponds in shape or form to a number of similar contiguously located objects or bodies. Thus an engineer may desire to select a tree as a given objective, and the particular tree so selected may be disposed in or adjacent to a group of similar trees. Due to the restricted range afforded through the telescope of the instrument, it is a difficult, exacting and laborious task to concentrate the telescope on such a selected objective to the satisfaction of a careful engineer. Again in making astronomical observations with small telescopes, it is a difficult matter to select a given star of a constellation and to be sure that the instrument is directed upon the selected star when the range is effected by sighting through the lenses only of the telescope. With the present invention, however, the sighting is effected quickly without magnification through the exterior appliances, in which an unrestricted field of vision is permitted, and then the desired magnification is obtained, without further substantial correction in the adusted positions of the barrel, in the viewing of the selected objective thorugh said barrel and its associated lens mechanism. Minor adjustments may be necessitated in this latter operation but this may be done with utmost convenience. I am aware, of course, that fixed exterior sighting appliances have been used on telescopes of various kinds and do not claim hereinafter such appliance broadly, since my improvement resides primarily in the employment of such exterior sighting appliances or telescopes wherein provision is made for adjusting the appliances relative to each other and to the telescope barrel whereby when said appliances are in registration with the eye of the observer and the desired objective, the field of vision obtained through the barrel will likewise specifically include the aforesaid objective.

What is claimed is:

1. A sighting appliance for surveyor's instruments and the like comprising a clamp formed to be frictionally secured to the casing of a telescope, an apertured sighting element provided with a threaded shank, said shank being receivable within a correspondingly formed socket formed in said clamp, and means for locking the threaded shank of the sighting element in desired positions of adjustment with respect to said clamp.

2. In apparatus of the class described, a telescope provided with a barrel containing lens mechanism, front and rear ring-type sighting appliances mounted exteriorly on said barrel and disposed contiguous to the front and rear ends of said barrel, and means supporting each appliance on said barrel for circumferential, radial and longitudinal adjustment with respect to the principal axis of said barrel.

3. Primary sighting means for surveyors' transits comprising longitudinally spaced front and rear clamps frictionally secured to the barrel of an associated transit, an apertured ring-like sighting element carried by each of said clamps, each of said sighting elements being provided with a threaded shank receivable within a correspondingly shaped socket formed in connection with its cooperative clamp, and means for locking the threaded shanks of the sighting elements in various positions of radial adjustment and with respect to said clamps.

4. In a surveyor's transit, a barrel provided with internal lens means, longitudinally-spaced, exteriorly-located ring-type sighting appliances mounted on said barrel, and means for adjusting said appliances radially relatively and with respect to said barrel so that the field of vision obtained by the unmagnified sighting through the joint rings of said appliances coincides with the restricted field of vision afforded through the internal lens means of said barrel.

EDWARD G. BRADBURY.